United States Patent
Fan et al.

(10) Patent No.: US 7,496,413 B2
(45) Date of Patent: Feb. 24, 2009

(54) APPARATUS AND METHOD FOR COORDINATING CONTROLLERS TO CONTROL A PAPER MACHINE OR OTHER MACHINE

(75) Inventors: Junqiang Fan, Vancouver (CA); Johan U. Backstrom, Vancouver (CA)

(73) Assignee: Honeywell ASCA Inc., Ontario (CA)

( * ) Notice: Subject to any disclaimer, the term of this patent is extended or adjusted under 35 U.S.C. 154(b) by 377 days.

(21) Appl. No.: 11/416,876

(22) Filed: May 3, 2006

(65) Prior Publication Data

US 2007/0260335 A1   Nov. 8, 2007

(51) Int. Cl.
*G05B 13/02*   (2006.01)
*G06F 7/66*   (2006.01)

(52) U.S. Cl. ............................ 700/29; 700/28; 700/31; 700/38; 700/127; 700/128; 162/198

(58) Field of Classification Search .................... 700/20, 700/29, 31, 38, 127–128; 162/198
See application file for complete search history.

(56) References Cited

U.S. PATENT DOCUMENTS 6,094,604 A    7/2000  Bucher et al.
6,185,470 B1 *  2/2001  Pado et al. ................... 700/104
6,347,254 B1 *  2/2002  Lu ............................... 700/29
6,807,510 B1   10/2004  Backstrom et al.
6,826,521 B1 * 11/2004  Hess et al. ..................... 703/12
7,376,472 B2 *  5/2008  Wojsznis et al. .............. 700/29
7,451,004 B2 * 11/2008  Thiele et al. .................. 700/28
2002/0022892 A1 *  2/2002  Bergold et al. ................ 700/19
2003/0120361 A1 *  6/2003  Anderson et al. ............. 700/31

OTHER PUBLICATIONS

"From data to diagnosis and control using generalized orthonormal basis filters. Part II: Model predictive and fault tolerant control", Patwardhan et al, Indian Institute of Technology, Science Direct 2005.*

* cited by examiner

*Primary Examiner*—Michael D Masinick
(74) *Attorney, Agent, or Firm*—Munck Carter P.C.

(57) ABSTRACT

A method includes receiving measurement data from at least one sensor at a first controller. The measurement data is associated with a process. The method also includes receiving a first output signal at the first controller. The first output signal is generated by a second controller and affects the process. The method further includes determining how to control at least a portion of the process using the measurement data and the first output signal. In addition, the method includes providing a second output signal, where the second output signal is operable to control at least the portion of the process. The second controller may be operable to use the second output signal to generate the first output signal.

21 Claims, 4 Drawing Sheets

APPARATUS AND METHOD FOR COORDINATING CONTROLLERS TO CONTROL A PAPER MACHINE OR OTHER MACHINE

TECHNICAL FIELD

This disclosure relates generally to control systems and more specifically to an apparatus and method for coordinating controllers to control a paper machine or other machine.

BACKGROUND

Various systems are available and used to manufacture sheets of paper and other paper products. The sheets of paper being manufactured often have multiple characteristics that are monitored and controlled during the manufacturing process, such as dry weight, moisture, and caliper (thickness). The control of these or other sheet properties in a sheet-making machine is typically concerned with keeping the sheet properties as close as possible to target or desired values.

There are often two different types of actuators that are used to control the sheet properties in a sheet-making machine. First, there are machine direction (MD) actuators that typically affect only the cross direction average of a sheet property. The MD actuators often can have different dynamic responses with respect to a sheet property. Second, there are cross direction (CD) actuators that are typically arrayed across a sheet in the cross direction. Each array of CD actuators can usually affect both the average of a sheet property and the cross direction shape of the sheet property. The CD actuators often can have different dynamic responses and different spatial responses with respect to a sheet property.

The overall control of the sheet properties is often a large-scale multivariable problem. For example, one CD actuator in a CD actuator array typically affects several sheet properties in adjacent CD zones. Also, a CD actuator array intended to control a particular sheet property can often affect the average of several sheet properties, which may also be affected by several MD actuators. The overall control of the sheet properties is also often a problem of very large scale. A typical sheet-making process may have thousands of outputs (such as sheet property measurements) and hundreds of inputs (such as actuator set points). In addition, the manufacturing process can often be difficult or impossible to control in certain spatial and intra-actuator set directions.

In conventional sheet-making equipment, the control of sheet properties is often separated into two control problems. First, the CD average is controlled only utilizing the MD actuators. Second, the CD actuators arrayed across the sheet are only utilized to control the CD variation in and around the average of the sheet properties. There are also MD control schemes available that utilize model predictive control with explicit h constraint handling for coordinating the MD actuators.

SUMMARY

This disclosure provides an apparatus and method for coordinating controllers to control a paper machine or other machine.

In a first embodiment, a method includes receiving measurement data from at least one sensor at a first controller. The measurement data is associated with a process. The method also includes receiving a first output signal at the first controller. The first output signal is generated by a second controller and affects the process. The method further includes determining how to control at least a portion of the process using the measurement data and the first output signal. In addition, the method includes providing a second output signal, where the second output signal is operable to control at least the portion of the process.

In particular embodiments, the second controller is operable to use the second output signal to generate the first output signal.

In other particular embodiments, the first output signal is operable to produce an effect on at least one characteristic of an item being produced using the process. The first controller is operable to generate the second output signal in order to control the at least one characteristic of the item being produced. The effect on the at least one characteristic produced by the first output signal is treated as a disturbance at the first controller.

In a second embodiment, an apparatus includes at least one interface operable to receive measurement data from at least one sensor. The measurement data is associated with a process. The apparatus also includes at least one processor operable to determine how to control at least a portion of the process using the measurement data and a first output signal. The first output signal is generated by a controller and affects the process. The at least one processor is also operable to provide a second output signal, where the second output signal is operable to control at least the portion of the process.

In a third embodiment, a computer program is embodied on a computer readable medium and is operable to be executed by a first controller. The computer program includes computer readable program code for receiving measurement data from at least one sensor at the first controller. The measurement data is associated with a process. The computer program also includes computer readable program code for receiving a first output signal at the first controller. The first output signal is generated by a second controller and affects the process. The computer program further includes computer readable program code for determining how to control at least a portion of the process using the measurement data and the first output signal. In addition, the computer program includes computer readable program code for providing a second output signal, where the second output signal is operable to control at least the portion of the process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
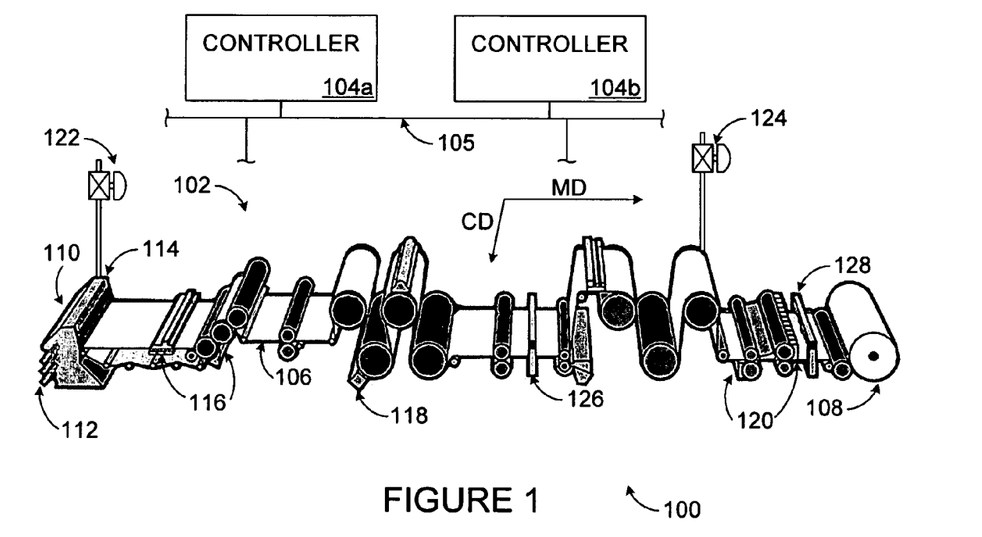
FIG. 1 illustrates an example paper production system according to one embodiment of this disclosure.

FIG. 1 illustrates an example paper production system 100 according to one embodiment of this disclosure. The embodiment of the paper production system 100 shown in FIG. 1 is for illustration only. Other embodiments of the paper production system 100 may be used without departing from the scope of this disclosure.

In this example, the paper production system 100 includes a paper machine 102, two controllers 104a-104b, and a network 105. The paper machine 102 includes various components used to produce a paper product. In this example, the various components may be used to produce a paper sheet 106 collected at a reel 108. The controllers 104a-104b monitor and control the operation of the paper machine 102. This may help to maintain or increase the quality of the paper sheets 106 produced by the paper machine 102.

As shown in FIG. 1, the paper machine 102 includes a headbox 110, which distributes a pulp suspension uniformly across the machine onto a continuous moving wire screen or mesh. The pulp suspension entering the headbox 110 may contain, for example, 0.2-3% wood fibres and/or other solids, with the remainder of the suspension being water. The headbox 110 may include an array of dilution actuators 112, which distributes dilution water into the pulp suspension across the sheet. The dilution water may be used to help ensure that the resulting paper sheet 106 has a more uniform basis weight across the sheet in the cross direction (CD). The headbox 110 may also include an array of slice lip actuators 114, which controls a slice opening across the machine from which the pulp suspension exits the headbox 110 onto the moving wire screen or mesh. The array of slice lip actuators 114 may also be used to control the CD basis weight of the paper sheet 106.

An array of steam actuators 116 produces hot steam that penetrates the paper sheet 106 and releases the latent heat in the steam into the paper sheet 106, thereby increasing the temperature of the paper sheet 106 in sections across the sheet. The increase in temperature may allow for easier cross direction removal of water from the paper sheet 106. An array of rewet shower actuators 118 adds small droplets of water (which may be air atomized) onto the surface of the paper sheet 106. The array of rewet shower actuators 118 may be used to control the moisture CD profile of the paper sheet 106, reduce or prevent over-drying of the paper sheet 106, or correct any dry streaks in the paper sheet 106. The paper sheet 106 is often passed through several nips of counter rotating rolls. An array of induction heating actuators 120 heats the shell surface of an iron roll across the machine. As the roll surface locally heats up, the roll diameter is locally expanded and hence increases nip pressure, which in turn locally compresses the paper sheet 106. The array of induction heating actuators 120 may therefore be used to control the caliper (thickness) CD profile of the paper sheet 106.

Two additional actuators 122-124 are shown in FIG. 1. A thick stock flow actuator 122 controls the consistency of the incoming pulp received at the headbox 110. A steam flow actuator 124 controls the amount of heat transferred to the paper sheet 106 from the drying cylinders. The actuators 122-124 could, for example, represent valves controlling the flow of pulp and steam, respectively. These actuators may be used for controlling MD dry weight and MD moisture. Additional components could be used to further process the paper sheet 106, such as a supercalender for improving the paper sheet's thickness, smoothness, and gloss.

This represents a brief description of one type of paper machine 102 that may be used to produce a paper product. Additional details reg ing this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing paper products and could be used with systems that produce other items or materials, such as plastic, textiles, metal foil or sheets, or other or additional materials.

In this example, the actuators 112-120 may represent cross direction or "CD" actuators, and the actuators 122-124 may represent machine direction or "MD" actuators. In general, the cross direction in the system 100 is typically perpendicular to the machine direction in the system 100.

In order to control the paper-making process, the properties of the paper sheet 106 may be continuously or repeatedly measured and the paper machine 102 adjusted to ensure sheet quality. This control may be achieved by measuring sheet properties at various stages in the manufacturing process. This information may then be used to adjust various actuators 112-124 within the paper machine 102 to compensate for any variations in the sheet properties from desired targets.

As shown in FIG. 1, the paper machine 102 includes two scanners 126-128, each of which may include a set of sensors. The scanners 126-128 are capable of scanning the paper sheet 106 and measuring one or more characteristics of the paper sheet 106. For example, the scanners 126-128 could carry sensors for measuring the weight, moisture, caliper (thickness), gloss, smoothness, or any other or additional characteristics of the paper sheet 106. Each of the scanners 126-128 includes any suitable structure or structures for measuring or detecting one or more characteristics of the paper sheet 106, such as sets or arrays of sensors. A scanning set of sensors represents one particular embodiment for measuring sheet properties. Other embodiments could include using stationary sets or arrays of sensors. Each of these embodiments may produce one or more arrays of measurements representing a CD profile. The cross direction (CD) in the system 100 is typically perpendicular to the machine direction (MD) in the system 100.

The controllers 104a-104b are capable of receiving measurement data from the scanners 126-128 and using the data to control the paper machine 102. For example, the controller 104a may be used to control the operation of the actuators 122-124, and the controller 104b may be used to control the operation of the actuators 112-120. However, any other association or assignment of actuators and controllers could be used in the system 100. Each of the controllers 104a-104b includes any hardware, software, firmware, or combination thereof for controlling the operation of at least part of the paper machine 102.

In some embodiments, the controller 104a could represent an MD controller that controls the operation of MD actuators (such as actuators 122-124), and the controller 104b could represent a CD controller that controls the operation of CD actuators (such as actuators 112-120). In other embodiments, at least one of the controllers 104a-104b could represent a CD and an MD or "CDMD" controller. In particular embodiments, the controller 104a may represent an MD proportional-integral-derivative (PID) controller, and the controller 104b may represent a CDMD model predictive controller (MPC) as described in U.S. Pat. No. 6,807,510 (which is hereby incorporated by reference). In other particular embodiments, both of the controllers 104a-104b could represent CDMD model predictive controllers.

If the controllers 104a-104b do not interact or are not coordinated in their operations, it is likely that one controller may interfere with the operation of the other controller or that the controllers may "fight" one another. For example, the slice lip actuators 114 may affect the dry weight, moisture, and caliper of the paper sheet 106. The dry weight profile may be controlled by the slice lip actuators 114 through a CD controller (such as controller 104a), and the moisture and caliper profiles may be controlled by the actuators 116 and 120 through an MPC controller (such as controller 104b). In this example, the disturbances to the moisture and caliper profiles caused by the controller 104a may affect the ability of the controller 104b to effectively control the moisture and caliper profiles.

According to this disclosure, the controllers 104a-104b may interact so that at least one controller may take into account the disturbances or other effects caused by another controller. For example, the controller 104b (such as an MPC controller) could consider the output of the controller 104a (such as an MD controller) in generating its output for controlling the paper machine 102. Similarly, each of the controllers 104a-104b (such as two MPC controllers) could consider the other's output when generating its own output for controlling the paper machine 102. In this way, the operations of the controllers may be coordinated more effectively, allowing the controllers to control the paper machine 102 more efficiently.

A network 105 is coupled to the controllers 104a-104b, the actuators 112-124, and the scanners 126-128. The network 105 facilitates communication between components of system 100. For example, the network 105 may communicate Internet Protocol (IP) packets, frame relay frames, Asynchronous Transfer Mode (ATM) cells, or other suitable information between network addresses. The network 105 may include one or more local area networks (LANs), metropolitan area networks (MANs), wide area networks (WANs), all or a portion of a global network such as the Internet, or any other communication system or systems at one or more locations. The network 105 may also operate according to any appropriate type of protocol or protocols, such as Ethernet, IP, X.25, frame relay, or any other packet data protocol.

Although FIG. 1 illustrates one example of a paper production system 100, various changes may be made to FIG. 1. For example, other systems could be used to produce paper products or other products. Also, while shown as including two controllers 104a-104b, the production system 100 could include more than two controllers. In addition, each of the controllers could control any suitable characteristic(s) or operation(s) of the paper machine 102.

Figure 2:
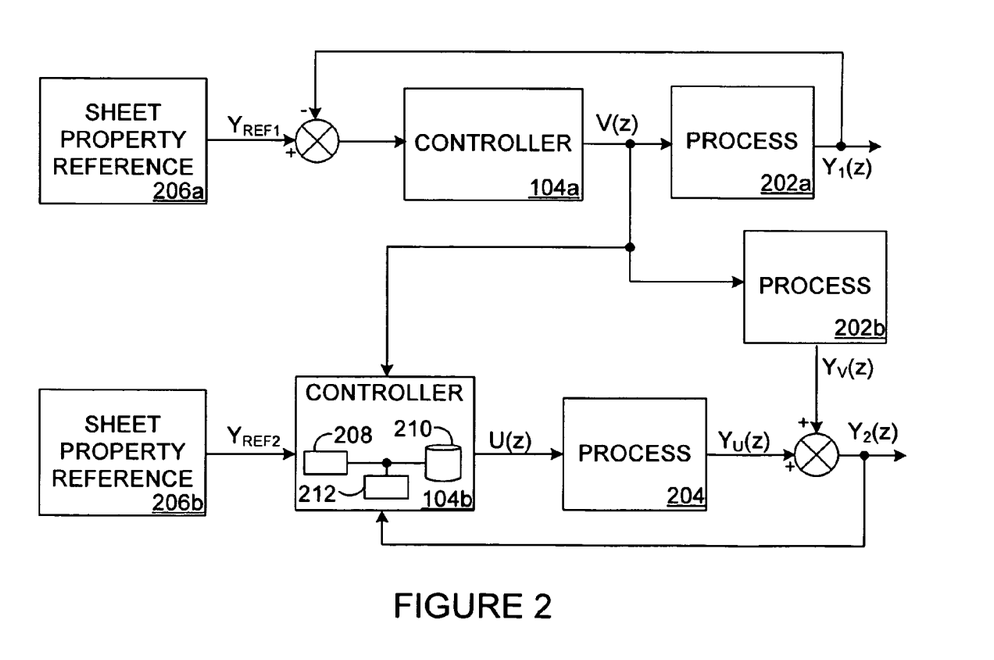
FIG. 2 illustrates an example interaction between controllers in a paper production system according to one embodiment of this disclosure.

FIG. 2 illustrates an example interaction between controllers in a paper production system according to one embodiment of this disclosure. For ease of explanation, the interaction between controllers shown in FIG. 2 is described with respect to the controllers 104a-104b operating in the paper production system 100 of FIG. 1. The interaction between controllers shown in FIG. 2 could involve any suitable controllers operating in any suitable system.

As shown in FIG. 2, the controller 104a operates to control a process 202a to thereby control a sheet property $Y_1(z)$. The controller 104a also has an effect on a sheet property $Y_2(z)$ through a process 202b. The controller 104b operates to control a process 204 to control the sheet property $Y_2(z)$. The processes 202a-202b and 204 could represent different aspects of the production system 100 that are controlled by the controllers 104a-104b. For example, the controller 104a could represent an MD controller (such as a PID controller) that controls the actuators 122-124 (processes 202a-202b), and the controller 104b could represent a CDMD MPC controller that controls the actuators 112-120 (process 204). Each of the controllers 104a-104b may operate to ensure that a property of the product being produced (such as the paper sheet 106) is at or near a reference 206a-206b, respectively.

As shown in this example, the output of the controller 104a is denoted V(z), and the output of the controller 104b is denoted U(z). The process 202b operates using the output V(z) of the controller 104a to provide an output denoted $Y_v(z)$, and the process 204 operates using the output U(z) of the controller 104b to provide an output denoted $Y_u(z)$. The outputs of the processes 202b and 204 collectively form the output $Y_2(z)$. The output $Y_2(z)$ represents the property of the product being produced that is monitored or controlled by the controller 104b.

Without any interaction or coordination between the controllers 104a-104b, the controller 104b may be less effective in controlling one or more characteristics of the product being produced. This may be due to the fact that the controller 104a can affect the output $Y_2(z)$ of the production process. If the controller 104b cannot predict how the controller 104a affects the output $Y_2(z)$, the controller 104b may be less effective in controlling the process 204 to produce a desired output $Y_2(z)$.

According to this disclosure, the controller 104b is capable of receiving the outputs of the controller 104a and treating the effects caused by the controller 104a ($Y_v(z)$) as disturbances to the process 204. For example, the controller 104b may operate a model (such as a model mathematically representing the process 202b) using the outputs of the controller 104a. This allows the controller 104b to take into account the effects of the controller 104a on the output $Y_2(z)$. This may also allow the controller 104b to more effectively control one or more characteristics of the product being produced because the controller 104b can consider how the controller 104a affects those characteristics.

In particular embodiments, the controller 104b may use the outputs of the controller 104a and utilize a model of the process 202b (as well as a model of its own process 204) in an objective function. For example, state-space models for the processes 202b and 204 and the overall process could be defined as follows:

$$x_u(k+1) = A_u x_u(k) + B_u \Delta U(k-T_d) \tag{1}$$

$$Y_u(k) = C_u x_u(k) \tag{2}$$

$$x_v(k+1) = A_v x_v(k) + B_v \Delta V(k-T_d) \tag{3}$$

$$Y_v(k) = C_v x_v(k) \tag{4}$$

$$Y_2(k) = Y_u(k) + Y_v(k). \tag{5}$$

Here, k represents discrete time, and $A_u$ and $A_v$ represent state transition matrices containing dynamic information of process 204 and process 202b, respectively. Also, $B_u$ and $B_v$ represent state input matrices containing static spatial information of process 204 and process 202b, respectively, and $C_u$ and $C_v$ represent state output matrices of process 204 and process 202b, respectively. Further, $x_u(k)$ and $x_v(k)$ represent states for process 204 and process 202b, respectively. In addition, $Y_2(k)$, U(k), and V(k) denote m measurement arrays, n CD actuator arrays, and p output arrays from the controller 104a, which may be defined as:

$$Y_2(k) = \begin{bmatrix} y_1(k) \\ \vdots \\ y_m(k) \end{bmatrix} = \underbrace{\begin{bmatrix} y_{u1}(k) \\ \vdots \\ y_{um}(k) \end{bmatrix}}_{Y_u} + \underbrace{\begin{bmatrix} y_{v1}(k) \\ \vdots \\ y_{vm}(k) \end{bmatrix}}_{Y_v}, \quad (6)$$

$$y_i \in R^{n_y \times 1}, i = 1, \ldots, m$$

$$U(k) = \begin{bmatrix} u_1(k) \\ \vdots \\ u_n(k) \end{bmatrix}, u_j \in R^{n_{uj} \times 1}, j = 1, \ldots, n \quad (7)$$

$$V(k) = \begin{bmatrix} v_1(k) \\ \vdots \\ v_p(k) \end{bmatrix}, v_j \in R^{n_{vj} \times 1}, j = 1, \ldots, p. \quad (8)$$

$\Delta$ in Equations (1) and (3) represents an actuator move, which may be defined as $\Delta U(k) = U(k) - U(k-1)$ and $\Delta V(k) = V(k) - V(k-1)$. Also, $T_d$ in Equations (1) and (3) represents the minimum time delay in samples of the process 204 and 202b. The CD measurement array $y_i(k)$ of sheet properties may have the same common resolution $n_y$ as defined in Equation (6). The $j^{th}$ CD actuator array (with $j=1, \ldots, n$) may have a dimension of $n_{uj}$, and the $j^{th}$ output array of the controller 104a may have a dimension of $n_{vj}$.

The states $x_u(k)$ and $x_v(k)$ in Equations (1)-(4) could be estimated as follows:

$$\hat{x}_u(k) = \hat{x}_{u0}(k) + L_u(Y_{real2}(k) - \hat{Y}_2(k)) \quad (9)$$

$$\hat{x}_v(k) = \hat{x}_{v0}(k) + L_v(Y_{real2}(k) - \hat{Y}_2(k)), \quad (10)$$

where:

$$\hat{x}_{u0}(k) = A_u x_u(k-1) + B_u \Delta U(k - T_d - 1) \quad (11)$$

$$\hat{x}_{v0}(k) = A_v x_v(k-1) + B_v \Delta V(k - T_d - 1) \quad (12)$$

$$\hat{Y}_2(k) = [C_u \quad C_v] \times \begin{bmatrix} \hat{x}_{u0}(k) \\ \hat{x}_{v0}(k) \end{bmatrix}. \quad (13)$$

Here, $L_u$ and $L_v$ represent observer gains, $Y_{real2}(k)$ represents real measurements from the scanners 126-128, and $\hat{Y}_2(k)$ represents the estimated measurements calculated from the estimated states. The estimated states $\hat{x}_u(k)$ and $\hat{x}_v(k)$ in Equations (9) and (10) can be used to calculate future predictions of the sheet properties $Y_{p2}(k+j)$ based on Equations (1)-(13). Each sheet property measurement array may be associated with a future sheet property target array $Y_{iref}(k+j)$, where $i=1, \ldots, m$. The target arrays may be concatenated into a larger target array $Y_{ref2}(k+j)$, similar to the measurement arrays of sheet properties $Y_2(k)$ in Equation (6).

The objective function used by the controller 104b could have the following form:

$$\min_{\Delta U} J(k) = \min_{\Delta U} \sum_{j=T_d+1}^{H_p} E_p^T(k+j) Q_1 E_p(k+j) + \quad (14)$$

$$\sum_{i=0}^{H_c - 1} \Delta U^T(k+i) Q_2 \Delta U(k+i) + U^T(k+i) M^T Q_3 M U(k+i) +$$

$$[U(k+i) U_{ref}(k+i)]^T Q_4 [U(k+i) U_{ref}(k+i)] +$$

$$U^T(k+i) S^T Q_5 S U(k+i)$$

where:

$$A \Delta U(k) < b. \quad (15)$$

Here, $E_p(k+j) = Y_{ref2}(k+j) - Y_{p2}(k+j)$ represents the future predicted errors in the sheet properties, and $Y_{p2}(k+j)$ is calculated using Equations (1)-(10). Also, $H_p$ and $H_c$ represent the prediction horizon and the control horizon, respectively, and $T_d$ is the time delay in Equations (1) and (3). Further, $Q_1$ represents a weighting matrix specifying the relative importance between different sheet properties and different CD locations of the paper sheet 106, and $Q_2$ represents a weighting matrix specifying the cost of changes in the actuator set points between two consecutive sample instances. The matrix M together with the weighting matrix $Q_3$ is used to specify the cost for different spatial directions in the actuator set point profiles. $Q_4$ represents a weighting matrix specifying the cost of actuator set points deviating from the desired reference or target set points $U_{ref}(k)$. The matrix S together with the weighting matrix $Q_5$ is used to specify the cost of moving the CD actuator arrays and the MD actuators in certain intra-actuator set point directions. A and b in Equation (15) represent a constraint matrix and a constraint vector specifying h constraints. Additional details regarding the parameters of a CDMD MPC controller (such as $Q_1$ to $Q_5$) can be found in U.S. Pat. No. 6,807,510.

A stand quadratic programming (QP) problem, which can be derived from the objective function in Equation (14) and the model in Equations (1)-(13), could be represented as:

$$\min_{\Delta U(k)} \frac{1}{2} \Delta U^T(k) \Phi \Delta U(k) + \varphi \cdot \Delta U(k) \quad (16)$$

where:

$$A \Delta U(k) < b. \quad (17)$$

Here, the Hessian matrix $\Phi$ may be symmetric and positive definite. The vector $\varphi$ in Equation (16) can be separated into two components:

$$\varphi = \varphi_u + \varphi_v \quad (18)$$

where $\varphi_u$ may be calculated from Equations (1), (2), (9), and (14), and $\varphi_v$ may be calculated from Equations (3), (4), (10), and (14).

In this example, the controller 104b may take into consideration the effects produced by the controller 104a (via $\varphi_v$) when controlling the process 204. As a result, the controller 104b may more effectively control the production of a product, such as by adjusting the process 204 to control a characteristic of the paper sheet 106 while predicting how the process 202b affects that characteristic.

In particular embodiments, the controller 104a could represent an MD controller, and the controller 104b could represent a CD controller (such as a CDMD MPC). To use the output of the MD controller 104a at the CD controller 104b, the output of the MD controller 104a (which may control a single-input, single-output system) may be converted into the corresponding dimensions used by models in the CD controller 104b (which may control a multiple-input, multiple-output system). As an example, an MD model could be represented as:

$$x(k+1) = ax(k) + b\Delta u_{MD}(k) \tag{19}$$

$$y_{MD}(k) = cx(k). \tag{20}$$

This model could be converted into a multiple-input, multiple-output model as follows:

$$X(k+1) = AX(k) + B\Delta U(k) \tag{21}$$

$$Y(k) = CX(k) \tag{22}$$

where:

$$X(k) = \begin{bmatrix} x(k) \\ \vdots \\ x(k) \end{bmatrix} \Bigg\} n_y, \ \Delta U(k) = \begin{bmatrix} \Delta u_{MD}(k) \\ \vdots \\ \Delta u_{MD}(k) \end{bmatrix} \Bigg\} n_y, \tag{23}$$

$$Y(k) = \begin{bmatrix} y_{MD}(k) \\ \vdots \\ y_{MD}(k) \end{bmatrix} \Bigg\} n_y,$$

$$A = \mathrm{diag}(\underbrace{a, \ldots, a}_{n_y}), \ B = \mathrm{diag}(\underbrace{b, \ldots, b}_{n_y}), \tag{24}$$

$$C = \mathrm{diag}(\underbrace{c, \ldots, c}_{n_y}).$$

Here, $n_y$ represents the dimension of the sheet property measurement array as defined in Equation (6).

In the example embodiment in FIG. 2, the controller 104b includes at least one processor 208 and at least one memory 210 storing data and instructions used by the processor(s) 208. The processor(s) 208 may implement control logic to control the process 204 while taking into account the effects caused by the controller 104a. The controller 104b also includes at least one interface 212, which may allow the controller 104b to communicate with the controller 104a, one or more actuators 112-124 in the paper machine 102, and one or more scanners 126-128. The interface 212 could represent any suitable interface, such as an Ethernet interface. In some embodiments, the technique described above could be implemented in a CDMD MPC controller by adjusting the vector φ.

Although FIG. 2 illustrates one example interaction between controllers in a paper production system, various changes may be made to FIG. 2. For example, each controller could control one or multiple processes, and some of the processes may not interact. Also, any number of controllers could be used in the paper production system.

Figure 3:
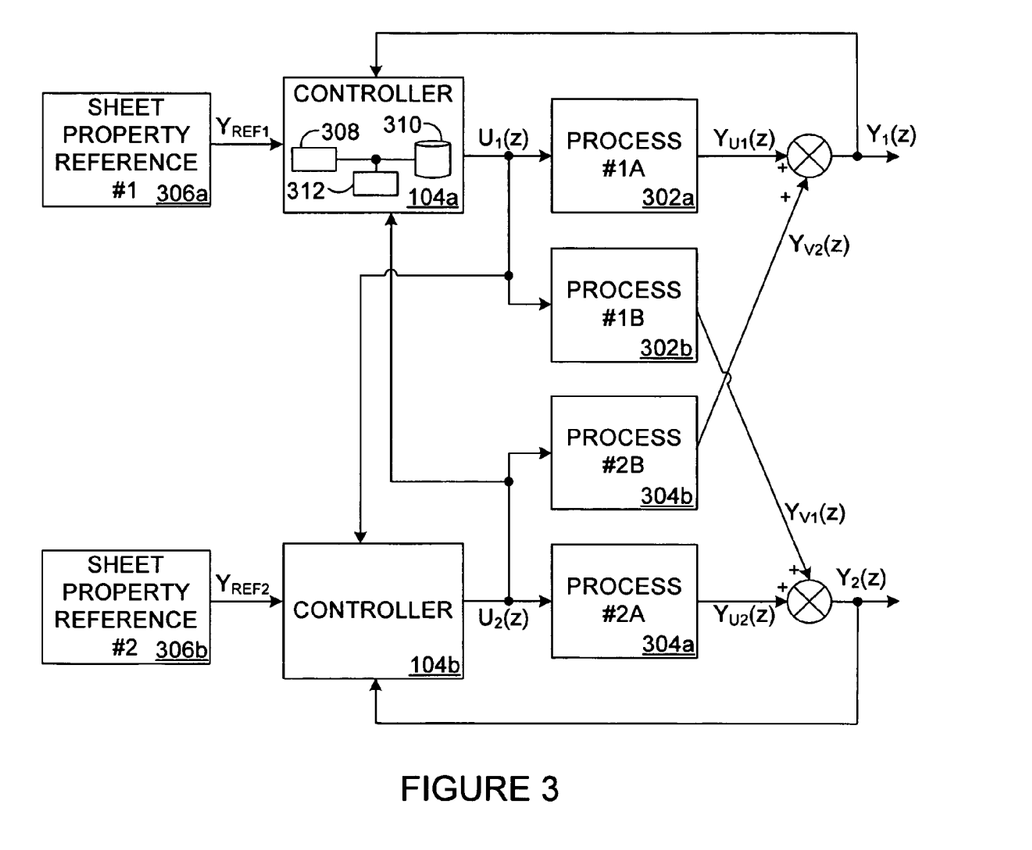
FIG. 3 illustrates another example interaction between controllers in a paper production system according to one embodiment of this disclosure.

FIG. 3 illustrates another example interaction between controllers in a paper production system according to one embodiment of this disclosure. For ease of explanation, the interaction between controllers shown in FIG. 3 is described with respect to the controllers 104a-104b operating in the paper production system 100 of FIG. 1. The interaction between controllers shown in FIG. 3 could involve any suitable controllers operating in any suitable system.

As shown in FIG. 3, the controller 104a operates to control a process 302a and affects $Y_2(z)$ through a process 302b, and the controller 104b operates to control a process 304a and affects $Y_1(z)$ through a process 304b. The processes 302a-302b and 304a-304b could represent different aspects of the paper machine 102 that are controlled by the controllers 104a-104b. In particular embodiments, both of the controllers 104a-104b may represent CDMD MPC controllers. The controllers 104a-104b may operate to ensure that different properties of a product being produced are at or near two references 306a-306b.

As shown in this example, the output of the controller 104a is denoted $U_1(z)$, and the output of the controller 104b is denoted $U_2(z)$. The processes 302a-302b operate using the output $U_1(z)$ of the controller 104a to provide outputs denoted $Y_{U1}(z)$ and $Y_{V1}(z)$, respectively. The processes 304a-304b operate using the output $U_2(z)$ of the controller 104b to provide outputs denoted $Y_{U2}(z)$ and $Y_{V2}(z)$, respectively. The outputs of the processes 302a and 304b collectively form the output $Y_1(z)$ of the production process. Also, the outputs of the processes 304a and 302b collectively form another output $Y_2(z)$ of the production process. The output $Y_1(z)$ represents the property of the product being produced that is monitored or controlled by the controller 104a, and the output $Y_2(z)$ represents the property of the product being produced that is monitored or controlled by the controller 104b.

Without any interaction or coordination between the controllers 104a-104b, each controller may be less effective in controlling its associated output $Y_1(z)$ or $Y_2(z)$. This may be due to the fact that the controller 104a could affect the output $Y_2(z)$ of the production process (via process 302b), and the controller 104b could affect the output $Y_1(z)$ of the production process (via process 304b).

According to this disclosure, each of the controllers 104a-104b is capable of receiving the outputs from the other controller and treating those outputs as disturbances. Each controller may then operate a model using, among other things, the outputs of the other controller. This allows each controller to take into account the effects caused by the other controller when controlling its particular processes. As a result, each controller may more effectively control a desired characteristic of a product being produced, such as by adjusting its processes to achieve a desired characteristic while predicting how the other controller affects that characteristic.

In some embodiments, each of the controllers 104a-104b in FIG. 3 may operate in the same or similar manner as the controller 104b in FIG. 2. For example, FIG. 2 illustrates a "one-way" coordination between controllers 104a-104b, where only one controller 104b is receiving and using the outputs from the other controller 104a. On the other hand, FIG. 3 illustrates a "two-way" coordination between controllers 104a-104b, where each controller is receiving and using the outputs from the other controller. As a result, the same or similar coordination functionality described above with respect to the controller 104b in FIG. 2 could be implemented or used by both controllers 104a-104b in FIG. 3.

In particular embodiments, each of the controllers 104a-104b includes at least one processor 308 and at least one memory 310 storing data and instructions used by the processor(s) 308. The processor(s) 308 may implement control logic to control one or more processes while taking into account the effects provided by the other controller. Each controller also includes at least one interface 312, which may allow each controller to communicate with the other controller, one or more actuators in the paper machine 102, and one or more scanners 126-128. The interface 312 could represent any suitable interface, such as an Ethernet interface.

Although FIG. 3 illustrates another example interaction between controllers in a paper production system, various changes may be made to FIG. 3. For example, each controller could control one or multiple processes, and some of the processes may not interact. Also, any number of controllers could be used in the paper production system.

Figure 4:
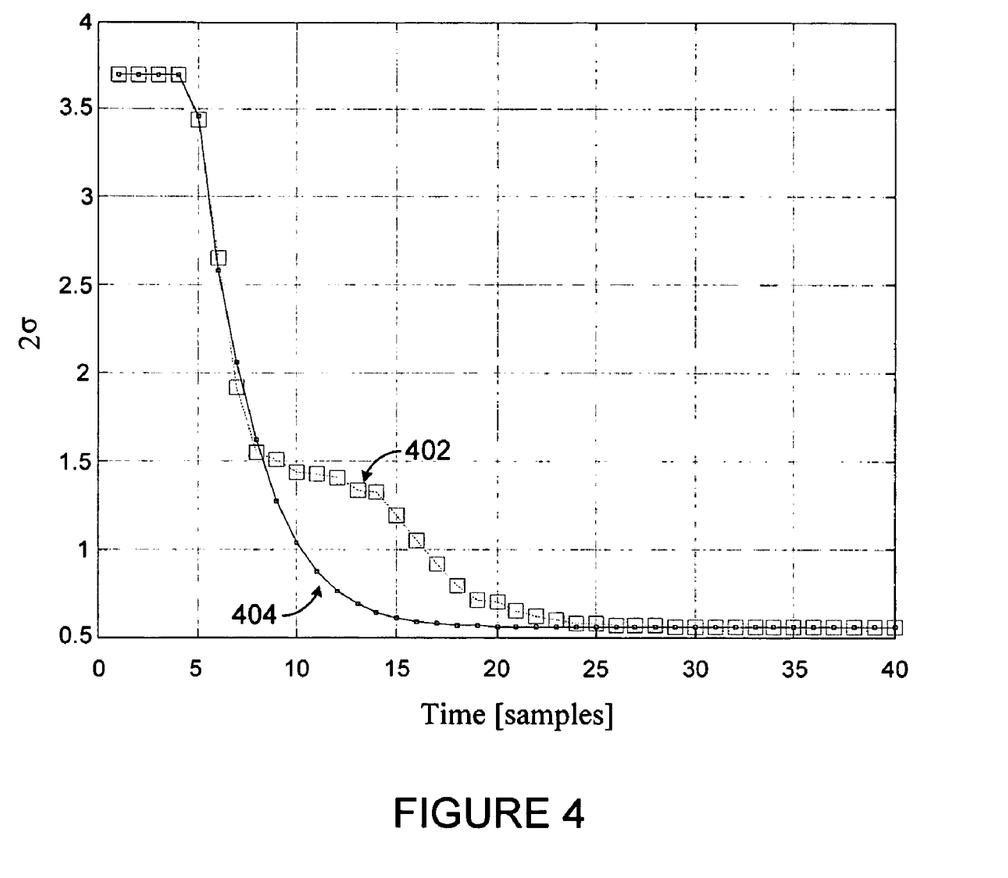
FIG. 4 illustrates example test results comparing operation of coordinated and non-coordinated controllers according to one embodiment of this disclosure.

FIG. 4 illustrates example test results comparing operation of coordinated and non-coordinated controllers according to one embodiment of this disclosure. In particular, FIG. 4 illustrates how two controllers 104a-104b may cooperate to control a linerbo paper machine 102 with four CD actuator arrays (two slice lip actuator arrays, one steam actuator array, and one rewet shower actuator array). The controllers 104a-104b are used to control two sheet properties (dry weight and moisture).

Assume that dry weight is controlled by a controller 104a controlling the two slice lip actuator arrays, and moisture is controlled by a CDMD MPC controller 104b with the steam actuator arrays and rewet shower actuator arrays. It is known in the paper industry that a 2-sigma of the controlled sheet properties (that is, twice the stand deviation of the measurement array) is used to measure the controllers' performance. FIG. 4 illustrates the 2-sigma trend plot of the moisture profile with and without coordination between the controllers (where the coordination is done at the CDMD MPC controller 104b). Here, line 402 represents the trend plot of the moisture profile as controlled by non-coordinated controllers. Line 404 represents the trend plot of the moisture profile as controlled by coordinated controllers.

As shown in FIG. 4, the coordinated controllers reject a disturbance more quickly than non-coordinated controllers. This may translate into more efficient control of the moisture profile by the coordinated controllers, resulting in better control of the moisture profile of the paper sheet 106 being produced by the paper machine 102.

Although FIG. 4 illustrates one example of test results comparing operation of coordinated and non-coordinated controllers, various changes may be made to FIG. 4. For example, the test results shown in FIG. 4 are for illustration only. Coordinated controllers could act or behave in any other or additional manner.

Figure 5:
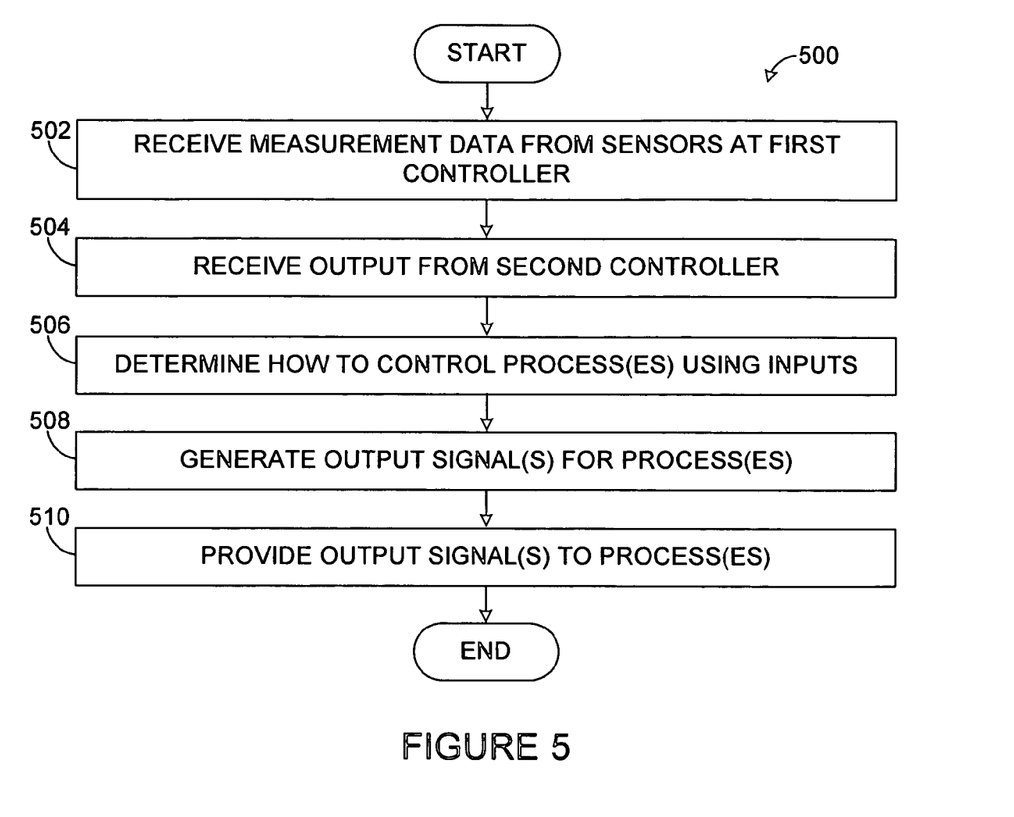
FIG. 5 illustrates an example method for coordinating controllers to control a paper machine or other machine according to one embodiment of this disclosure.

FIG. 5 illustrates an example method 500 for coordinating controllers to control a paper machine or other machine according to one embodiment of this disclosure. For ease of explanation, the method 500 of FIG. 5 is described with respect to the system 100 of FIG. 1. The method 500 could be used with any other suitable system.

Measurement data is received from one or more sensors at a first controller at step 502. This may include, for example, the controller 104b in FIG. 1 receiving measurement data from one or more of the scanners 126-128. The measurement data could relate to any characteristic or characteristics of a product being produced, such as the dry weight, moisture, or caliper of the paper sheet 106.

Outputs from a second controller are received at the first controller at step 504. This may include, for example, the controller 104b receiving the output signal produced by the controller 104a. The output signal produced by the controller 104a could represent any suitable signal, such as a signal composed of output values used to adjust the operation of one or more actuators of the paper machine 102.

The first controller determines how to control one or more processes using these inputs at step 506. This may include, for example, the controller 104b operating a model of the process controlled by the controller 104a using the outputs of the controller 104a. The outputs of the controller 104a could first be converted from the dimensions used by the controller 104a (such as MD model space) into the dimensions used by the controller 104b (such as CD model space). The controller 104b may also operate a model of its own process.

The first controller generates one or more output signals for one or more processes at step 508. This may include, for example, the controller 104b generating an output signal for controlling its process based on the operation of the model(s).

The first controller provides the one or more output signals to the one or more processes at step 510. This may include, for example, the controller 104b outputting control signals to different components of the paper machine 102, such as to one or more of the actuators in the paper machine 102.

In this way, the first controller may more effectively control its particular process(es) or an overall production process. The first controller may do this by taking into account the effects of the second controller on the characteristic(s) being controlled by the first controller.

Although FIG. 5 illustrates one example of a method 500 for coordinating controllers to control a paper machine or other machine, various changes may be made to FIG. 5. For example, while shown as a series of steps, various steps shown in FIG. 5 could occur in a different order or in parallel. Also, the second controller could operate in a similar manner as shown in FIG. 5, enabling two-way coordination as shown in FIG. 3.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a h disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in h ware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving measurement data from at least one sensor at a first controller, the measurement data associated with at least one characteristic of an item being produced using a process;

receiving a first output signal at the first controller, the first output signal generated by a second controller and affecting a first portion of the process;

determining how to control a second portion of the process using the measurement data and the first output signal, wherein the first and second portions of the process affect the at least one characteristic of the item being produced; and providing a second output signal, the second output signal operable to control the second portion of the process;

wherein determining how to control the second portion of the process comprises:

estimating multiple states associated with the process using multiple state-space models, at least two of the state-space models associated with the first and second portions of the process, at least two of the estimated states associated with the first and second portions of the process;

calculating future predictions of the at least one characteristic of the item being produced using the estimated states;

defining an objective function using the future predictions; and solving a problem based on minimizing the objective function using a vector, the vector comprising first and second components associated with the first and second controllers, respectively.

2. The method of claim 1, wherein:
the first output signal is operable to produce an effect on the at least one characteristic of the item being produced using the process; and
the first controller is operable to generate the second output signal in order to control the at least one characteristic of the item being produced, the effect on the at least one characteristic produced by the first output signal treated as a disturbance at the first controller.

3. The method of claim 2, wherein determining how to control the second portion of the process further comprises generating the state-space models.

4. The method of claim 2, wherein:
the first controller comprises a cross direction, machine direction (CDMD) model predictive controller (MPC); and
the second controller comprises a machine direction (MD) proportional-integral-derivative (PID) controller.

5. The method of claim 1, wherein the second controller is operable to use the second output signal to generate the first output signal.

6. The method of claim 5, wherein the first and second controllers comprise cross direction, machine direction (CDMD) model predictive controllers (MPG).

7. The method of claim 1, wherein:
the process comprises a paper production process; and
the measurement data comprises data associated with at least one of: weight, moisture, caliper, gloss, and smoothness of paper being produced.

8. The method of claim 1, wherein:
a first of the components of the vector is based on (i) at least one of the state-space models that is associated with the first portion of the process, (ii) at least one of the estimated states that is associated with the first portion of the process, and (iii) the objective function; and
a second of the components of the vector is based on (i) at least one of the state-space models that is associated with the second portion of the process, (ii) at least one of the estimated states that is associated with the second portion of the process, and (iii) the objective function.

9. The method of claim 1, wherein the problem comprises a quadratic programming problem.

10. An apparatus, comprising:
at least one interface operable to receive measurement data from at least one sensor and to receive a first output signal from a controller, the measurement data associated with at least one characteristic of an item being produced using a process, the first output signal affecting a first portion of the process; and at least one processor operable to:
determine how to control a second portion of the process using the measurement data and the first output signal, wherein the first and second portions of the process affect the at least one characteristic of the item being produced; and
provide a second output signal, the second output signal operable to control the second portion of the process;

wherein the at least one processor is operable to determine how to control the second portion of the process by:
estimating multiple states associated with the process using multiple state-space models, at least two of the state-space models associated with the first and second portions of the process, at least two of the estimated states associated with the first and second portions of the process;

calculating future predictions of the at least one characteristic of the item being produced using the estimated states;

defining an objective function using the future predictions; and solving a problem based on minimizing the objective function using a vector, the vector comprising first and second components associated with the first and second controllers, respectively.

11. The apparatus of claim 10, wherein:
the first output signal is operable to produce an effect on the at least one characteristic of the item being produced using the process; and
the at least one processor is operable to generate the second output signal in order to control the at least one characteristic of the item being produced, the effect on the at least one characteristic produced by the first output signal treated as a disturbance.

12. The apparatus of claim 11, wherein the at least one processor is further operable to generate the state-space models.

13. The apparatus of claim 11, wherein:
the at least one interface and the at least one processor reside in a cross direction, machine direction (CDMD) model predictive controller (MPC); and
a machine direction (MD) proportional-integral-derivative (PID) controller is operable to generate the first output signal.

14. The apparatus of claim 10, wherein the controller is operable to use the second output signal to generate the first output signal.

15. The apparatus of claim 14, wherein:
the controller comprises a cross direction, machine direction (CDMD) model predictive controller (MPG); and
the at least one interface and the at least one processor reside in another CDMD MPG.

16. The apparatus of claim 10, wherein:
the process comprises a paper production process;
the measurement data comprises data associated with at least one of: weight, moisture, caliper, gloss, and smoothness of paper being produced; and
the at least one interface comprises an Ethernet interface.

17. A computer program embodied on a computer readable medium, the computer program comprising:
- computer readable program code for receiving measurement data from at least one sensor at the first controller, the measurement data associated with at least one characteristic of an item being produced using a process;
- computer readable program code for receiving a first output signal at the first controller, the first output signal generated by a second controller and affecting a first portion of the process;
- computer readable program code for determining how to control a second portion of the process using the measurement data and the first output signal, wherein the first and second portions of the process affect the at least one characteristic of the item being produced; and
- computer readable program code for providing a second output signal, the second output signal operable to control the second portion of the process;
- wherein the computer readable program code for determining how to control the second portion of the process comprises:
  - computer readable program code for estimating multiple states associated with the process using multiple state-space models, at least two of the state-space models associated with the first and second portions of the process, at least two of the estimated states associated with the first and second portions of the process;
  - computer readable program code for calculating future predictions of the at least one characteristic of the item being produced using the estimated states;
  - computer readable program code for defining an objective function using the future predictions; and
  - computer readable program code for solving a problem based on minimizing the objective function using a vector, the vector comprising first and second components associated with the first and second controllers, respectively.

18. The computer program of claim 17, wherein:
the first output signal is operable to produce an effect on the at least one characteristic of the item being produced using the process; and
the computer readable program code for determining how to control the second portion of the process comprises computer readable program code for generating the second output signal in order to control the at least one characteristic of the item being produced, the effect on the at least one characteristic produced by the first output signal treated as a disturbance.

19. The computer program of claim 18, wherein:
the first controller comprises a cross direction, machine direction (CDMD) model predictive controller (MPG); and
the second controller comprises a machine direction (MD) proportional-integral-derivative (PID) controller.

20. The computer program of claim 17, wherein the second controller is operable to use the second output signal to generate the first output signal.

21. The computer program of claim 20, wherein the first and second controllers comprise cross direction, machine direction (CDMD) model predictive controllers (MPG).

* * * * *

UNITED STATES PATENT AND TRADEMARK OFFICE
CERTIFICATE OF CORRECTION

PATENT NO. : 7,496,413 B2 Page 1 of 1
APPLICATION NO. : 11/416876
DATED : February 24, 2009
INVENTOR(S) : Junqiang Fan et al.

It is certified that error appears in the above-identified patent and that said Letters Patent is hereby corrected as shown below:

In Column 13, line 51, delete "MPG" add --MPC--;
In Column 14, line 59, delete "MPG" add --MPC--;
In Column 14, line 61, delete "MPG" add --MPC--;
In Column 16, line 21, delete "MPG" add --MPC--;
In Column 16, line 30, delete "MPG" add --MPC--.

Signed and Sealed this

Twenty-first Day of April, 2009

JOHN DOLL
*Acting Director of the United States Patent and Trademark Office*